US012547239B2

(12) United States Patent
Lafontaine et al.

(10) Patent No.: US 12,547,239 B2
(45) Date of Patent: Feb. 10, 2026

(54) SYSTEMS AND METHODS FOR VIRTUAL INTERACTION

(71) Applicant: 9337-0286 QUÉBEC INC. (AUGER GROUPE CONSEIL), Trois-Rivières (CA)

(72) Inventors: Marcel Lafontaine, Victoriaville (CA); Jonathan Marcoux, Trois-Rivières (CA); Alan Marchand, Becancour (CA)

(73) Assignee: 9337-0286 QUÉBEC INC. (AUGER GROUPE CONSEIL), Trois-Rivières (CA)

(*) Notice: Subject to any disclaimer, the term of this patent is extended or adjusted under 35 U.S.C. 154(b) by 120 days.

(21) Appl. No.: 18/547,865

(22) PCT Filed: Feb. 24, 2022

(86) PCT No.: PCT/CA2022/050261
§ 371 (c)(1),
(2) Date: Aug. 24, 2023

(87) PCT Pub. No.: WO2022/178632
PCT Pub. Date: Sep. 1, 2022

(65) Prior Publication Data
US 2024/0135663 A1 Apr. 25, 2024
US 2024/0231476 A9 Jul. 11, 2024

Related U.S. Application Data

(60) Provisional application No. 63/153,611, filed on Feb. 25, 2021.

(51) Int. Cl.
G06F 3/01 (2006.01)
G06F 3/04815 (2022.01)
(Continued)

(52) U.S. Cl.
CPC .......... *G06F 3/011* (2013.01); *G06F 3/04815* (2013.01); *G06F 3/14* (2013.01);
(Continued)

(58) Field of Classification Search
None
See application file for complete search history.

(56) References Cited

U.S. PATENT DOCUMENTS

2015/0042748 A1  2/2015  Tian et al.
2016/0026253 A1  1/2016  Bradski et al.
(Continued)

OTHER PUBLICATIONS

Orts-Escolano, Sergio et al., "Holoportation: Virtual 3D Teleportation in Real-time", User Interface Software and Technology, ACM, 2 Penn Plaza, Suite 701 New York NY 10121-0701 USA, Oct. 16, 2016 (Oct. 16, 2016), pp. 741-754, XP058299654, DOI: 10.1145/2984511.2984517, ISBN: 978-1-4503-4189-9.
(Continued)

Primary Examiner — Edward Martello
(74) Attorney, Agent, or Firm — Duane Morris LLP

(57) ABSTRACT

A method for virtual interaction between a host user at a first physical location and a guest user at a second physical location is provided. The method includes receiving, by the guest assembly, environmental information relating to a host environment in the first physical location; displaying, a 3D virtual reconstruction of the host environment at the second physical location using the environmental information; and displaying a virtual avatar of the host user within the 3D virtual reconstruction. A guest user can enter a predefined area of the second physical location to be virtually transported to the host environment. The method further provides for virtual reconstruction of surfaces of the host environment and applying textures to those surfaces. A corresponding system and non-transitory computer readable medium are also described.

20 Claims, 3 Drawing Sheets

(51) Int. Cl.
  *G06F 3/14* (2006.01)
  *G06T 13/40* (2011.01)
  *G06T 19/00* (2011.01)
(52) U.S. Cl.
  CPC ............ *G06T 13/40* (2013.01); *G06T 19/003* (2013.01); *G06T 19/006* (2013.01); *G06T 2200/24* (2013.01); *G06T 2210/41* (2013.01); *G06T 2219/024* (2013.01)

(56) References Cited

U.S. PATENT DOCUMENTS

| | | | |
|---|---|---|---|
| 2017/0365102 A1* | 12/2017 | Huston | A63F 13/65 |
| 2017/0371499 A1 | 12/2017 | Checkley et al. | |
| 2018/0241707 A1 | 8/2018 | Sarafa et al. | |
| 2018/0330515 A1 | 11/2018 | Stall et al. | |
| 2019/0094981 A1 | 3/2019 | Bradski et al. | |
| 2020/0016495 A1 | 1/2020 | Cruz et al. | |
| 2020/0066045 A1 | 2/2020 | Stahl et al. | |
| 2020/0184221 A1 | 6/2020 | Alexander | |
| 2020/0210137 A1 | 7/2020 | Noris et al. | |
| 2020/0322395 A1 | 10/2020 | Copley et al. | |
| 2020/0404217 A1 | 12/2020 | Yerli | |
| 2022/0070238 A1 | 3/2022 | Yerli | |

OTHER PUBLICATIONS

Koskela, Timo et al., "Avatarex: Telexistence System based on Virtual Avatars", Proceedings of the 9th Augmented Human International Conference, Feb. 6, 2018 (Feb. 6, 2018), pp. 1-8, XP093235035, New York, New York, USA, ISBN: 978-1-4503-5415-8.

Koskela, Timo et al., "Hybrid Avatars—Enabling co-Presence in Multiple Realities", WEB3D Technology, ACM, 2 Penn Plaza, Suite 701 New York NY 10121-0701 USA, Jul. 22, 2016 (Jul. 22, 2016), pp. 69-72, XP058277330, DOI: 10.1145/2945292.2945308, ISBN: 978-1-4503-4428-9.

Extended European Search Report in EP Application No. 22758664. 1, dated Jan. 10, 2025, in 12 pages.

International Search Report and Written Opinion on the Patentablility of Application No. PCT/CA2022/050261, mailed May 3, 2022, 10 pages.

\* cited by examiner

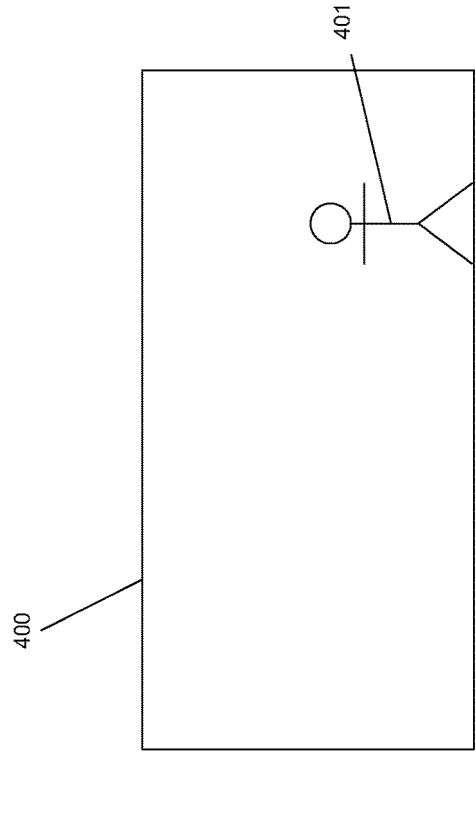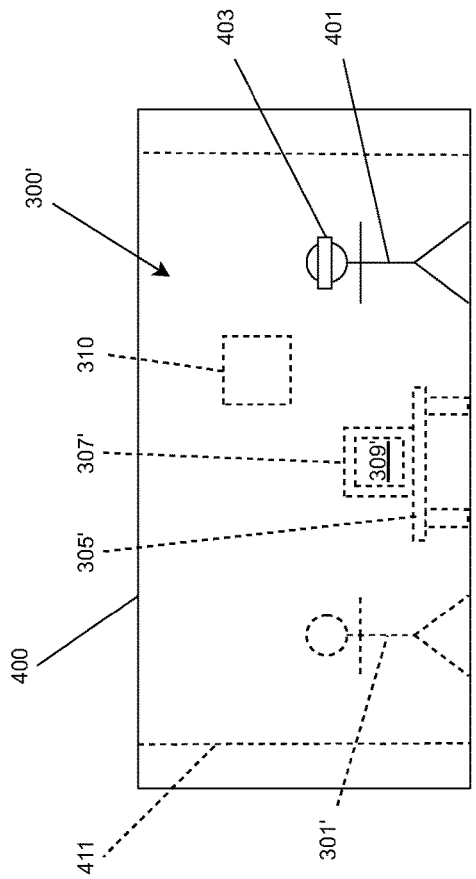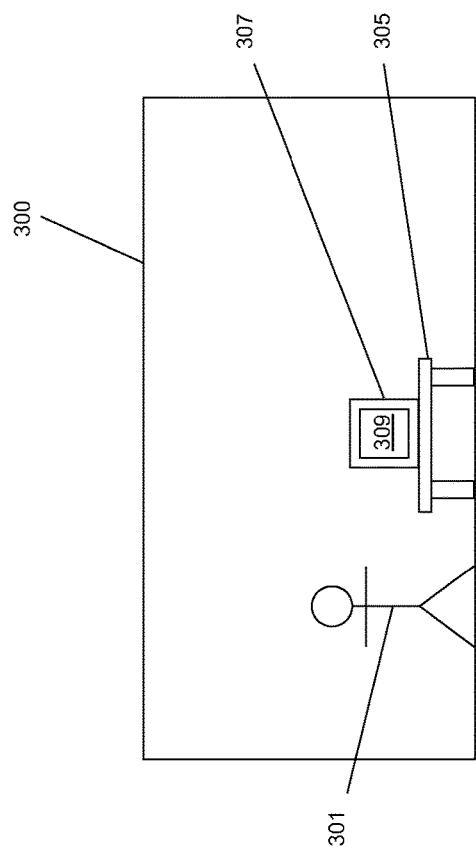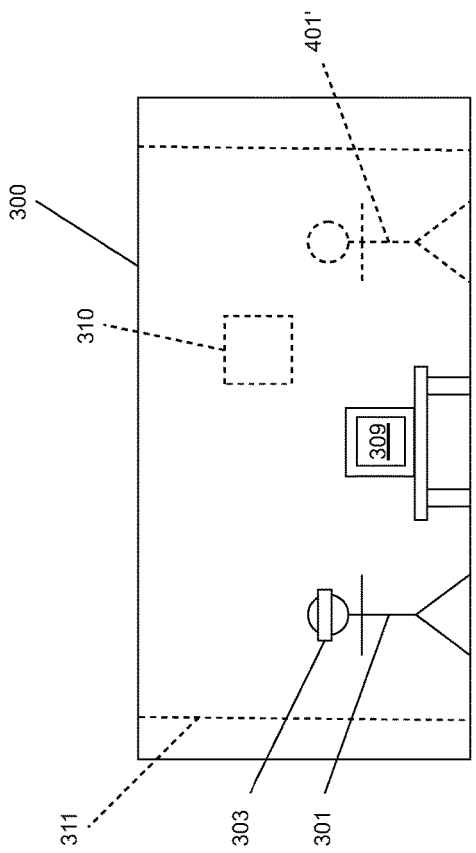
FIG. 2A
FIG. 2B
FIG. 3A
FIG. 3B

SYSTEMS AND METHODS FOR VIRTUAL INTERACTION

BENEFIT CLAIM

This application is a U.S. national stage application under 35 U.S.C. § 371 of International Application No. PCT/CA2022/050261, filed Feb. 24, 2022, which claims the benefit under 35 U.S.C. § 119 (e) of U.S. Provisional Application No. 63/153,611, filed Feb. 25, 2021, the entire disclosures of which are hereby incorporated by reference.

TECHNICAL FIELD

The technical field generally relates to virtual reality (VR), augmented reality (AR), and mixed reality (MR), and more specifically to using VR, AR and/or MR devices to facilitate virtual interaction.

BACKGROUND

Videoconferencing is a popular technology that allows users to visually interact at a distance. However, this technology is not well adapted for communicating complex actions in 3D space. There is therefore much room for improvement.

SUMMARY

According to an aspect, a system for virtual interaction between a host user at a first physical location and a guest user at a second physical location is provided. The system includes: a host assembly at the first physical location, the host assembly including: a user interface module configured to display a virtual avatar of the guest user within a host environment at the first physical location based on received interaction data relating to the guest user, and to capture interaction data relating to the host user; an environment detection module configured to capture environmental information relating to the host environment; and a communications module configured to receive interaction data relating to the guest user, and to transmit the interaction data relating to the host user and the environmental information relating to the host environment for display at the second physical location; and a guest assembly at the second physical location, the guest assembly including: a user interface module configured to: display a 3D virtual reconstruction of the host environment at the second physical location based on received environmental information relating to the host environment; display a virtual avatar of the host user within the 3D virtual reconstruction of host environment at the second physical location based on received interaction data relating to the host user; and capture interaction data relating to the guest user within the virtual reconstruction of the host environment; and a communications module configured to receive the interaction data relating to the host user, and to transmit the interaction data relating to the guest user for displaying the virtual guest avatar within the host environment at the first physical location.

According to an aspect, a method for virtual interaction between a host user at a first physical location and a guest user at a second physical location is provided. The method includes: receiving, via a host assembly, interaction data relating to the guest user; displaying, based on the received interaction data, a virtual avatar of the guest user within a host environment in the first physical location; capturing, via the host assembly, interaction data relating to the host user within the host environment; capturing, via the host assembly, environmental information relating to the host environment; and transmitting the interaction data relating to the host and the environmental information relating to the host environment to a guest assembly, for virtually reconstructing the host environment at the second physical location in 3D and displaying a virtual avatar of the host user therein.

According to an aspect, a method for virtual interaction between a host user at a first physical location and a guest user at a second physical location is provided. The method includes: receiving, via a guest assembly, environmental information relating to a host environment in the first physical location; displaying, based on the receiving environmental information, a 3D virtual reconstruction of the host environment at the second physical location; receiving, via a guest assembly, interaction data relating to the host user; displaying, based on the received interaction data, a virtual avatar of the host user within the virtual reconstruction of host environment in the second physical location; capturing, via the guest assembly, interaction data relating to the guest user within the virtual reconstruction of the host environment; and transmitting the interaction data relating to the guest to a host assembly, for displaying a virtual avatar of the guest user within the host environment at the first physical location.

According to an aspect, a system for virtual interaction between a host user in a host environment at a first physical location and a guest user at a second physical location is provided. The system includes a guest assembly at the second physical location, the guest assembly including: a user interface module configured to display a 3D virtual reconstruction of the host environment at the second physical location based on received environmental information relating to the host environment, display a virtual avatar of the host user within the 3D virtual reconstruction of the host environment based on received interaction data relating to the host user, and capture interaction data relating to the guest user within the virtual reconstruction of the host environment; and a communications module configured to receive the environmental information relating to the host environment, receive the interaction data relating to the host user in the host environment, and transmit the interaction data relating to the guest user.

According to an aspect, a method for virtual interaction between a host user at a first physical location and a guest user at a second physical location is provided. The method includes: receiving, via a guest assembly at the second physical location, environmental information relating to a host environment in the first physical location; displaying, by the guest assembly, a 3D virtual reconstruction of the host environment at the second physical location using the received environmental information; receiving, via the guest assembly, interaction data relating to the host user; displaying, by the guest assembly, a virtual avatar of the host user within the 3D virtual reconstruction of host environment in the second physical location using the received interaction data relating to the host user; capturing, via the guest assembly, interaction data relating to the guest user within the 3D virtual reconstruction of the host environment; and transmitting, by the guest assembly to a host assembly at the first physical location, the interaction data relating to the guest user, the interaction data allowing to display a virtual avatar of the guest user within the host environment at the first physical location.

According to an aspect, a non-transitory computer-readable medium is provided. The non-transitory computer-readable medium has instructions stored thereon which, when executed, cause a processor to carry out the methods as described above.

BRIEF DESCRIPTION OF THE DRAWINGS

FIGS. 2A and 2B are schematics illustrating a method for virtual interaction from the perspective of a host user, according to an embodiment.

FIGS. 3A and 3B are schematics illustrating a method for virtual interaction from the perspective of a guest user, according to an embodiment.

DETAILED DESCRIPTION

Broadly described, the present disclosure relates to using VR, AR and/or MR devices to facilitate remote interactions in 3D space. One or more guest users can be virtually transported into a physical environment of a host user. The host user will be able to see guest avatars in their physical environment and will be able to interact with the guest users via their avatars. Meanwhile, the guest users will be able to see the physical environment of the host user in 3D, while also being able to communicate with the host user and/or other guest users using their avatars.

Figure 1:
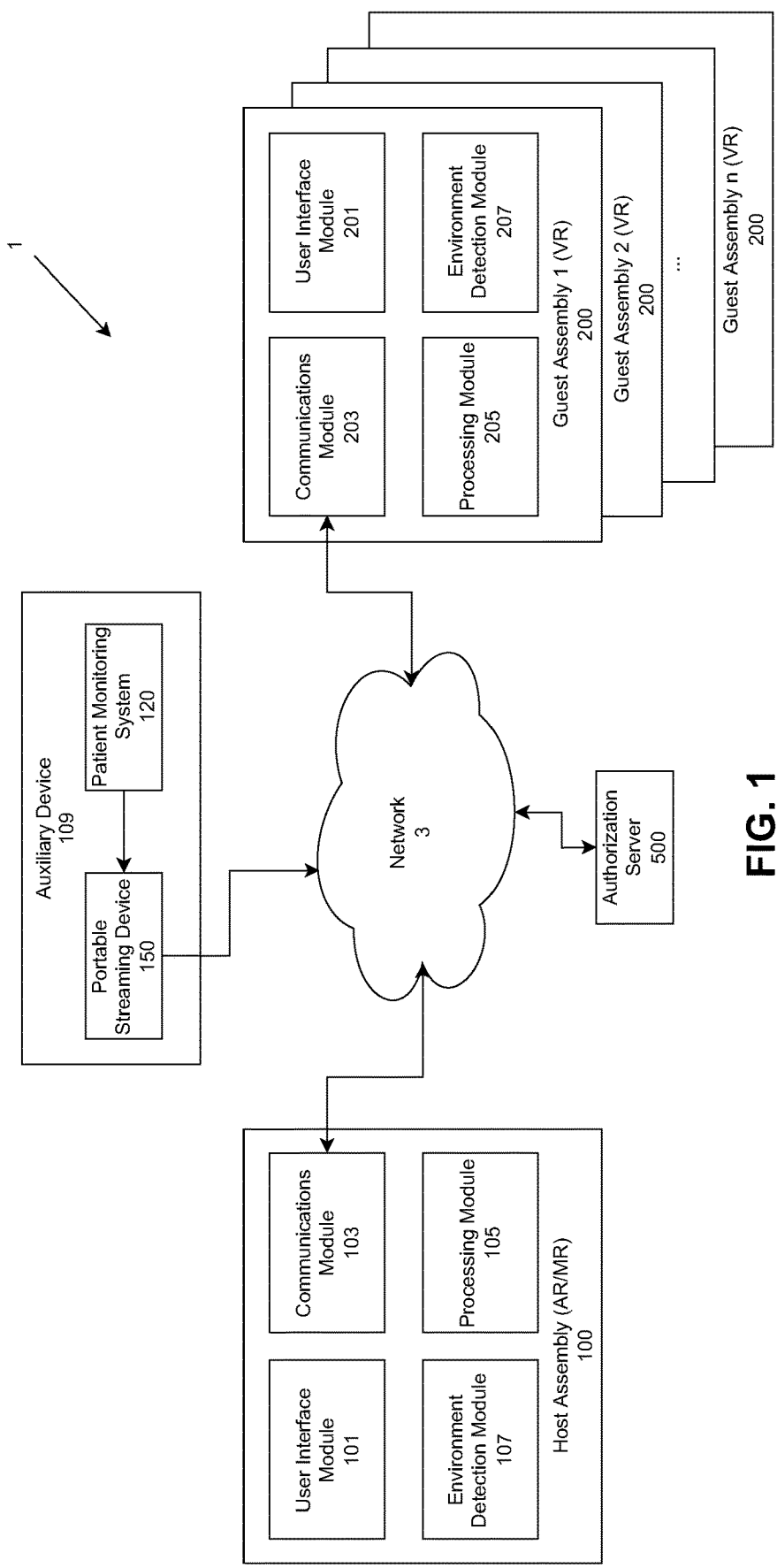
FIG. 1 is a block diagram illustrating an exemplary embodiment of a system for virtual interaction.

With reference to FIG. 1, an exemplary system 1 for virtual interaction is shown according to an embodiment. The system 1 includes a host assembly 100, one or more auxiliary devices 109, and one or more guest assemblies 200 configured to interact with one another. The system can further include an authorization server 500 to authorize and/or broker interactions and sharing of data between host assembly 100, one or more auxiliary devices 109 and one or more guest assemblies 200. The host assembly 100 and auxiliary devices 109 are associated with a first physical location, whereas the guest assemblies 200 are associated with one or more second physical locations that are separate and distinct from the first physical location. In this configuration, the host assembly 100 can allow a host user to virtually interact with one or more guest users at the first physical location, while the guest assemblies 200 can allow the one or more guest users to interact with the host users and/or other guest users at the second physical locations. The auxiliary devices 109 can transmit data to the host assembly 100 and/or to the guest assemblies 200 to enrich the interactions at the first and/or second physical locations. Although in the illustrated embodiment a single host assembly 100 is shown, it is appreciated that in other embodiments a plurality of host assemblies 100 can be provided. In such embodiments, the plurality of host assemblies 100 can allow one or more host users at the first physical location to interact with one or more guest users at the second physical location.

As will be described in more detail hereinafter, the host assembly 100 can be configured to carry out a number of functionalities, including virtually augmenting the first physical location using digital content and allowing the host user to interact with the digital content. In some embodiments, the host assembly 100 can comprise a wearable AR/MR device that implements at least some of these functionalities, such as the Microsoft HoloLens. It is appreciated, however, that other AR/MR devices are possible as well, and that similar functionality can also be implemented using a VR device.

In more detail now, the host assembly 100 can include a user interface module 101, a communications module 103, a processing module 105, and an environment detection module 107. As can be appreciated, these modules need not be implemented in a standalone device. Instead, the host assembly 100 can comprise one or more separate devices that include hardware and/or software to implement these modules. For example, the host assembly 100 can comprise a wearable AR/MR device in addition to external sensors and an external computer or server. It should further be appreciated that each module need not be implemented on a single hardware device and/or at a single physical location. For example, some modules can be implemented via software running on hardware at the first physical location, via software running on an external server (such as a cloud server), or a combination of both.

The user interface module 101 can be configured to virtually project 3D digital content in the first physical location and receive input to allow the host user to interact with the 3D digital content. For example, the user interface module 101 can include a wearable display configured to present stereoscopic images to the wearer. It is appreciated, however, that other types of displays are possible. The user interface module 101 can further include any suitable user input devices. Such input devices can, for example, include one or more sensors for tracking the host user's body movements (including head movements and/or hand gestures) through preferably 6 degrees of freedom, one or more sensors for tracking the host user's position in the physical location, one or more sensors for capturing the host user's voice, one or more handheld controllers, etc. As can be appreciated, some of these sensors can be integrated in the wearable display while others can be separate hardware devices, such as smart cameras positioned throughout the first physical location.

The communications module 103 can be configured to send and/or receive data from external devices via different communication channels and/or different protocols. In the present embodiment, the communications module 103 allows host assembly 100 to communicate with one or more guest assemblies 200 via a network 3. The communications can, for example, be facilitated and/or brokered via authorization server 500 that can also be reached via network 3. The data exchanged over network 3 can allow users to interact with one another using their respective host 100 or guest 200 assemblies. As can be appreciated, different types of networks are possible, such as a personal area network (PAN), a local area network (LAN), a wide area network (WAN), among others. Depending on the type and extent of network 3, users can interact with one another from greater distances. For example, if network 3 corresponds to a LAN, users can interact between physical locations corresponding to different spaces of a common building or campus. If the network 3 corresponds to a WAN, such as the internet, interaction between more distant physical locations is possible, such as spaces in different cities or countries.

In the present embodiment, the communications module 103 is also configured to send and/or receive data from one or more auxiliary devices 109 associated with the first physical location. Auxiliary devices 109 can be any type of device that can provide information that can be used to enhance the 3D digital content displayed to the host user or guest users, and/or that can assist in recreating environmental elements that are present in the first physical location.

The communications module 103 can be configured to interface with the auxiliary devices 109 to receive data therefrom, for example in the form of video, audio or data streams, among others. As an example, in an embodiment where system 1 is used in a medical setting, auxiliary device 109 can comprise a patient monitoring system 120 having a display. The communications module 103 can be configured to interface with auxiliary device 109 and receive data from the patient monitoring system 120, such as patient vital information recorded by the patient monitoring system 120 and/or data that reflects what is shown on the display of the patient monitoring system 120 at any given time. Although a patient monitoring system 120 is described, it is appreciated that auxiliary device 109 can comprise other devices that are associated with the first physical location.

In some embodiments, the auxiliary device 109 can comprise a hardware interface acting as a bridge to facilitate sending data to and/or receiving data from one or more devices associated with the first physical location. By way of example, the auxiliary device 109 can comprise a portable streaming device 150. The portable streaming device 150 can be configured to interface with a device associated with the first physical location, such as a patient monitoring device 120 in the illustrated embodiment. The portable streaming device 150 can capture data from device 120, and transmit the captured data remotely, for example to host assembly 100 via communications module 103 and/or to authorized guest assemblies 200. In the present embodiment, the network 3 corresponds to the internet, and the streaming device 150 is configured to capture a video signal from device 120 and to stream the captured video securely over the internet to authorized users. More specifically, the streaming device 150 has a dedicated connection to the internet through which peer-to-peer communication with other devices can be established, and through which the video stream can be transmitted. It is appreciated, however, that other configurations are possible. For example, in some embodiments, the streaming device 150 can interface directly with host assembly 100 via communications module 103, to transmit the video stream directly and/or over a local network instead of over the internet. In some embodiments, the streaming device 150 can interface directly with host assembly 100 via communication module, and utilize the host assembly's connection to the internet to establish peer-to-peer communications with other devices and/or to transmit the video stream to other devices. In some embodiments, the streaming device 150 can be configured to transmit other types of data acquired from device 120, such as an audio stream, a data stream, etc.

Figure 4B:
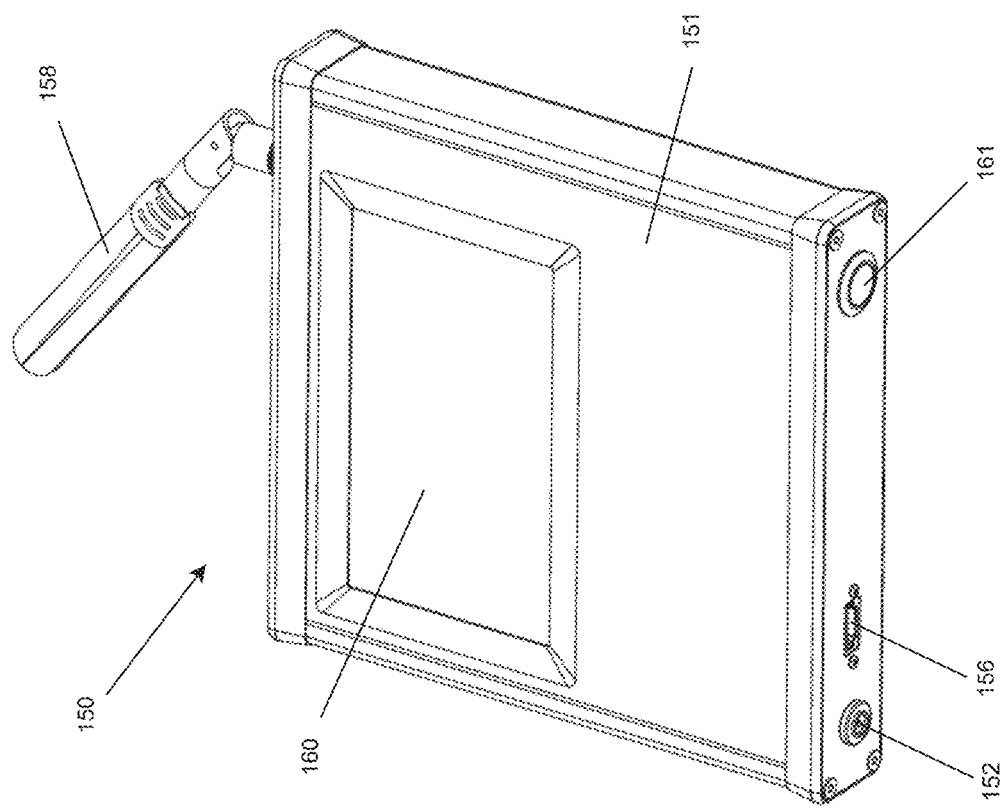
FIGS. 4A and 4B are respectively a schematic and a perspective view of a portable streaming device, according to an embodiment.
Figure 4A:
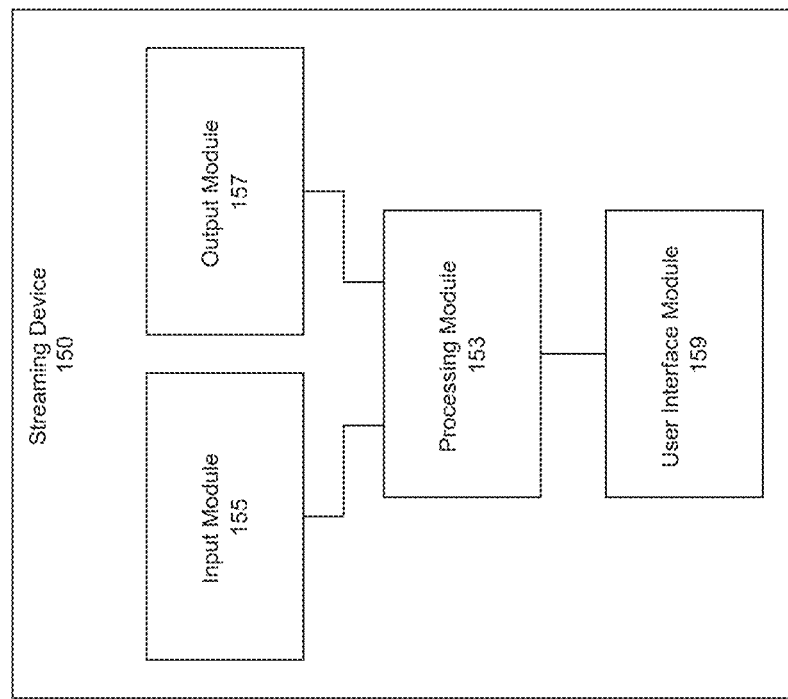

In more detail now, and with reference to FIGS. 4A and 4B, an exemplary portable streaming device 150 is shown according to an embodiment. The streaming device 150 comprises a housing 151 made from aluminum. It is appreciated, however, that the housing can be made of other materials that facilitate heat dissipation and/or that are suitable for use in medical environments. The housing supports a processing module 153 operatively connected to an input module 155, an output module 157, and a user interface module 159. In the present embodiment, the processing module 153 comprises a mini-PC configured to operate in a kiosk mode and configured to automatically run an application at start-up to enable capture and streaming of a video signal via input 155, output 157 and user interface 159 modules. It is appreciated, however, that other processing hardware is also possible. It is further appreciated that the streaming device 150 and its modules can be powered via any suitable means. For example, in the present embodiment, an external power supply can be connected via power connector 152. In other embodiments, the power supply can be at least partially integrated in the housing 151, for example in the form of a battery.

The input module 155 is configured to interface with an external device 120 and receive data therefrom. In the present embodiment, the input module 155 comprises an input HDMI port 156 configured to receive a video signal from an HDMI output of device 120. It is appreciated that other ports and/or connections are possible depending on the data to be received from the external device 120 and/or the types of connections available on the external device 120. For example, in some embodiments, the input HDMI port 156 can be configured to receive an audio signal. In some embodiments, different wired or wireless connection types can be used to interface with external device 120 and receive data therefrom. The input module 155 can further be configured to convert an input signal from external device 120 into a format suitable for the processing module 153. For example, in the present embodiment, the input module 155 is configured to convert an audio/video HDMI signal received via HDMI port into a USB signal for input to the mini-PC in processing module 153.

The output module 157 is configured to enable communications with external devices, for example to establish connections with authorized devices over a network and share a real-time video stream. The output module 157 can comprise a wireless radio and corresponding antenna 158, allowing the streaming device 150 to wirelessly connect to a network. In the present embodiment, the wireless radio corresponds to a Long-Term Evolution (LTE) radio, providing the streaming device 150 with a direct broadband connection to the internet. It is appreciated that other wired and/or wireless connections are possible to allow the streaming device 150 to communicate over the internet, over a local network, and/or directly with host assembly 100. In some embodiments, the connection can provide a bandwidth of at least 2 Mbps to allow real-time streaming of 1080P video. The output module 157 can further be configured to convert a video/audio signal into a format suitable for secure remote streaming, for example by compressing the video/audio signal, encrypting the video/audio signal, and/or separating the signal into packets for real-time transmission over a network.

In some embodiments, the output module 157 can include an output interface, such as an output HDMI port, for repeating video signals or other data received via input module 155. As can be appreciated, the output interface can allow chaining multiple streaming devices 150 together to provide redundancy for streaming in case one streaming device fails 150. For example, a first streaming device can interface with external device 120 via input module 155 of first streaming device, and with a second streaming device via output module 157 of first streaming device. A signal received via input module 155 can be streamed remotely by output module 157 via a wireless radio while also being passed along to the second streaming device by the output module via output interface. The second streaming device can receive the signal from first streaming device via its input module 155 and stream remotely by its output module 157 on a separate, parallel stream. Subsequent streaming devices can also be chained to second streaming device in a similar manner if needed. It is appreciated, however, that other configurations are possible for providing redundancy. For example, a plurality of streaming devices can be connected to external device 120 in parallel (such as via a signal splitter) instead of being chained in series.

The user interface module 159 is configured to allow a user to interact with the streaming device 151 and confirm proper operation. In the present embodiment, the user interface module 159 comprises an LCD screen 160 allowing a user to have a live view of the video stream received via the HDMI port 156. The screen 160 can further be provided with touch functionality, for example to receive user inputs for controlling applications running on the processing module 153. An external power button 161 is also provided to allow a user to easily power the device on or off as needed. The processing module 153 can be configured to run a software application that facilitates streaming of data received via input module 155 to authorized devices via output module 157. The application can be configured to run automatically when the streaming device 150 is powered on. When running, the application can cause the streaming device 150 to communicate with authorization server 500 to initiate a stream. More specifically, the streaming device 150 can create a session with the server 500 and send information to the server 500 indicating that it is ready to stream. When an external device, such as a host assembly 100 and/or one or more guest assemblies 200, wishes to receive the stream, the external device can first communicate with the authorization server 500. The authorization server 500 can determine whether the user of the external device is authorized (for example using any suitable authentication service, such as Azure Active Directory), and if the user is authorized, the server 500 can exchange information (such as connection parameters) between the streaming device 150 and the external device such that they can establish a direct peer-to-peer connection over which the stream can be transmitted. The streaming device 150 can be configured to encrypt the stream prior to transmittal (for example via AES-128) which can then be decrypted once received by the external device. Accordingly, the information exchanged by server 500 can include encryption/decryption keys to enable end-to-end encryption between the streaming device 150 and the external devices receiving the streams.

In some embodiments, one or more streaming devices 150 can have their streams grouped into virtual rooms by the authorization server 500. For example, streams from a plurality of streaming devices 150 associated with the same physical location can be grouped into a same virtual room, whereas streaming devices 159 associated with a different physical location can be grouped into a different room. In such embodiments, a user authorized to access a given room can be provided access to all streams contained within those rooms. When powering on the streaming device 150, a prompt can be presented via user interface module 159, for example on touchscreen 160, prompting a user to select an existing room or to create a new room. The user's selection can subsequently be communicated to server 500 to place the stream from the streaming device 150 in the appropriate virtual room and manage permissions accordingly.

Referring back to FIG. 1, the processing module 105 of host assembly 100 can be operatively coupled to the user interface module 101, communication module 103 and environment detection module 107, and can be configured to carry out any processing required by such modules. As an example, processing module 105 can be configured to generate and/or organize 3D digital content for display to the host user, to interpret and/or act responsive to data received from user input devices, auxiliary devices 109, and guest assemblies 200, etc. In some embodiments, processing module 105 can comprise memory storing computer-readable program instructions, and a processor for executing said instructions. It is appreciated, however, that other configurations are possible. For example, processing module 105 can comprise an application-specific integrated circuit (ASIC) and/or any other hardware capable of carrying out logical operations. It is further appreciated that processing module 105 can carry out some processing tasks on a device worn by the host user, and other processing tasks on a separate computing device such as a computer or remote server (such as a cloud server).

Environment detection module 107 can be configured to detect, map and/or virtually model an environment of the first physical location, including environmental elements such as surfaces (including ceiling and walls) and physical objects positioned throughout the environment. The module 107 can comprise any suitable sensors capable of detecting objects in the physical location, such as one or more cameras or other scanning devices. In some embodiments, the module 107 can comprise shared sensors, for example utilizing one or more cameras integrated in a wearable device for both detecting host user's inputs/gestures and modelling the environment of the first physical location. In some embodiments, the module 107 can comprise dedicated sensors, such as a series of fixed cameras positioned throughout the first physical location. Additional dedicated sensors can be provided in areas that require more precise monitoring. For example, a dedicated camera can be provided to closely follow an object of interest.

As can be appreciated, the environment detection module 107 can be configured to capture and segment volumetric data of the environment in order to generate 3D models of different physical objects in the first physical location, for example using a volumetric sensor to generate point clouds or other 3D modelling techniques. The module 107 can be configured to identify objects and track their position and/or movements in the first physical location. In some embodiments, the module 107 can further be configured to sample object surfaces, for example by capturing 2D images thereof. In some embodiments, dedicated sensors can be provided to sample object surfaces. For example, a dedicated camera can be provided to capture detailed images and/or continuous video of a display that is part of an object in the first physical location (such as a display of a patient monitoring device). The environment detection module 107 can further include sensors for detecting position and/or orientation of a camera used to capture images in the environment.

As will be described in more detail hereinafter, one or more guest assemblies 200 can be provided for interacting with the host user. Each guest assembly 200 can be configured to virtually recreate the environment of the host user so that the guest user can interact therein. Recreating the environment can comprise virtually reconstructing physical objects in addition to any digital content that has been added to the environment. As can be appreciated, the guest assembly 200 can comprise any suitable hardware for immersing a guest user in a virtual 3D environment. For example, the guest assembly 200 can comprise a wearable AR device. It is appreciated, however that similar functionalities can also be carried out using AR/MR devices.

In more detail now, the guest assembly 200 can include a user interface module 201, a communications module 203, a processing module 205, and an environment detection module 207. As can be appreciated, these modules need not be implemented in a standalone device. Instead, the guest assembly 200 can comprise one or more separate devices that include hardware and/or software to implement these modules. For example, the guest assembly 200 can comprise a wearable VR device in addition to external sensors and an external computer or server. It should further be appreciated that each module need not be implemented on a single hardware device and/or at a single physical location. For example, some modules can be implemented via software running on hardware at the first physical location, via software running on an external server (such as a cloud server), or a combination of both.

The user interface module 201 can be configured to immerse a guest user in a virtual 3D environment and receive input to allow the guest user to interact with the 3D digital content in the environment. For example, the user interface module 201 can include a wearable display configured to present stereoscopic images to the wearer as the guest user moves through a second physical location. It is appreciated, however, that other types of displays are possible. The user interface module 201 can further include any suitable user input devices. Such input devices can, for example, include one or more sensors for tracking the guest user's body movements (including head movements and/or hand gestures) through preferably 6 degrees of freedom, one or more sensors for tracking the guest user's position in the physical location, one or more sensors for capturing the guest user's voice, one or more handheld controllers, etc. As can be appreciated, some of these sensors can be integrated in the wearable display while others can be separate hardware devices, such as smart cameras positioned in the second physical location.

The communications module 203 can be configured to send and/or receive data from external devices via different communication channels and/or different protocols. In the present embodiment, the communications module 203 allows guest assembly 200 to communicate with host assembly 100 via the network 3, as described above. The communications module 203 can further be configured to communicate with auxiliary device 109 over network 3, for example to receive video, audio or other data streams from the auxiliary device 109. The processing module 205 can be operatively coupled to the user interface module 201, communication module 203, and environment detection module 207, and can be configured to carry out any processing required by such modules. As an example, processing module 205 can be configured to generate and/or organize 3D digital content for display to the guest user, to interpret and/or act responsive to data received from user input devices and host assembly 100, etc. In some embodiments, processing module 205 can comprise memory storing computer-readable program instructions, and a processor for executing said instructions. It is appreciated, however, that other configurations are possible. For example, processing module 205 can comprise an application-specific integrated circuit (ASIC) and/or any other hardware capable of carrying out logical operations. It is further appreciated that processing module 205 can carry out some processing tasks on a device worn by the guest user, and other processing tasks on a separate computing device such as a computer or remote server (such as a cloud server).

Environment detection module 207 can be configured to detect, map and/or virtually model an environment of the second physical location. The module 207 can comprise any suitable sensors capable of detecting the environment of the second physical location and/or objects contained therein, such as one or more cameras or other scanning devices. As can be appreciated, the environment detection module 207 can allow providing a guest user with feedback about their immediate physical environment, particularly where the guest user's view of the physical environment would otherwise be obstructed (for example while wearing an opaque VR headset as part of user interface module 201). In some configurations, the environment detection module 207 can include a camera that allows providing a stereoscopic view of the guest user's immediate physical environment while wearing a VR headset, effectively recreating what the guest user would see when not wearing the VR headset. This can allow the guest user to view their environs without removing the VR headset. In other configurations, the environment detection module 207 can include a proximity sensor which can, for example, be used to warn the guest user if they are approaching an object or wall in their physical environment to avoid physical collisions while the guest user is completely immersed in a virtual environment while wearing VR headset.

As mentioned above, the system 1 can allow one or more host users to virtually interact with one or more guest users, while virtually transporting the guest users into an environment of the host user or users. With additional reference to FIGS. 2A and 2B, an exemplary method for virtual interaction will be explained from the perspective of a host user. As shown in FIG. 2A, the host user 301 is situated in a host environment 300. The host environment 300 can correspond to any 3D space at a first physical location where the host user 301 is free to explore. In some embodiments, the space can be delimited by physical barriers, such as walls. In further embodiments, the space can be virtually delimited. For example, the host environment 300 can correspond to a defined area of a larger space, such as a predetermined area that is equipped for tracking movements and interactions of the host user 301 therein. In some embodiments, the host environment 300 can be delimited by virtual barriers, such as by virtual walls 311 that can be hidden or virtually projected within the host environment 300 and visible to host user 301.

The host environment 300 includes environmental elements such as physical objects with which host user 301 can physically interact. In the present embodiment, the environmental elements include a table 305, and a patient monitoring system 307 which includes a display 309. It is appreciated, however, that other environmental elements are possible. In the present embodiment, the environmental elements 305, 307 are mobile in that the host user 301 can move them freely throughout the host environment 300 via physical manipulation. It is appreciated, however, that some environmental elements can be fixed.

As shown in FIG. 2B, the host user 301 interacts with guest user 401 in the host environment 300 via host assembly 100. More specifically, in the illustrated embodiment, the host user 301 wears an AR/MR headset 303 that virtually projects 3D digital content into the host environment 300. While wearing the AR/MR headset 303, the host user 301 can continue to see the host environment 300 and environmental elements therein, while also being able to see spatially aware 3D digital content projected throughout the environment 300. The 3D digital content includes at least an avatar 401' corresponding to guest user 401, thereby allowing the host user 301 to see and interact with a virtual representation of the guest user 401. The guest avatar 401' is controlled by the guest user 401 and reflects the current position/perspective of the guest user in the 3D space of the host environment 300 as the guest user explores a virtual representation of the host environment. In some embodiments, the guest avatar 401' can reflect gestures that are made by the guest user 401. As can be appreciated, in some embodiments, a plurality of host users can each wear a respective AR/MR headset such that each host user can be presented with the spatially aware 3D digital content projected into host environment 300.

In the present embodiment, the 3D digital content also includes at least one virtual object 310. The virtual object 310 can correspond to any 2D or 3D model that can be virtually projected in the host environment 300 to facilitate communication between host user 301 and guest user 401. In some implementations, virtual object 310 can be configured to resemble familiar physical objects, such as medical tools or devices. In some implementations, virtual object 301 can be configured to present information such as an image, a video, a document (such as a pdf), a webpage or other graphical user interface for software, etc. In the present embodiment, the virtual object 310 is a shared object in that it is visible to both the host user 301 and guest user 401. It is appreciated, however, that some virtual objects can be private virtual objects, and thus be visible only to host user 301 or only to guest user 401.

In some embodiments, the virtual object 310 can comprise a video stream received from auxiliary device 109. Live video received from the auxiliary device 109 can thus be displayed as part of a 2D or 3D shared or private virtual object 310 positioned within the host environment 300. For example, the video received from auxiliary device 109 can correspond to a live view of display 309 of the patient monitoring device 307. A virtual object 310 comprising the video can be positioned within the virtual environment, such that a live virtual copy of display 309 is provided at a convenient location. This can be useful, for example, if the actual display 309 is not at a convenient location, and/or if it would be inconvenient to physically reposition the patient monitoring device 307 and/or its display 309. It can also be useful in providing a guest user 401 with a dedicated and/or clearer view of what is being shown on the display 309.

In the illustrated embodiment, the shared virtual object 310 can be freely manipulated and positioned in 3D space by both the host user 301 and guest user 401. It is appreciated that in some embodiments, permissions to manipulate and position the shared virtual object 310 can be restricted to only the host user 301 or guest user 401. It is further appreciated that if the virtual object 310 corresponds to a private object, the virtual object 310 can be positioned and manipulated only by the user to which it belongs.

In some embodiments, the virtual object 310 can be positioned at an absolute position within host environment 300 such that once positioned, the virtual object 310 can remain at the same 3D position in the host environment 300 until it is repositioned. It is appreciated, however, that in some embodiments, virtual objects 310 can be positioned at relative positions within the host environment 300.

As an example, virtual objects 310 can be positioned relative to physical objects in the host environment, such that the virtual objects 310 follow movement of the physical objects as they move through 3D space. As an example, virtual object 310 can correspond to a virtual sticky note that can be attached to patient monitoring system 307, and that can follow patient monitoring system 307 as the monitoring system moves about the host environment 300. This can be implemented by host assembly 100 and/or guest assembly 200 using any suitable process. For example, the process can involve determining a position of a physical object in the host environment 300, determining a position of a virtual object relative to the physical object, identifying a movement of the physical object and, in response thereto, determining a new position of the physical object, determining a new position of the virtual object to maintain the same relative position to the physical object in the new position of the physical object, and repositioning the virtual object into the determined new position. As can be appreciated, the process can be carried out continuously such that the virtual object can follow the physical object in real time while the physical object is being moved.

As another example, virtual objects 310 can be positioned relative to host user 301, guest user 401 and/or their avatars 301', 401', such that the virtual objects follow movement of the host user 301, guest user 401 and/or their avatars 301', 401' as they move through 3D space. The virtual object can be positioned relative to the host user 301 and/or host avatar 301', for example at a fixed distance relative thereto, such as at an arm's length. As the host user 301 and/or host avatar 301' moves about in 3D space, the virtual object can follow such that is always remains at arm's length until repositioned to another relative or absolute position. As can be appreciated, where virtual object comprises a video received from auxiliary device, the video from the auxiliary device can always remain at arms length to the host user 301 and/or guest user 401. The host user 301 and/or guest user 401 need only orient their field of view in the direction of the positioned virtual object to see the video from the auxiliary device. As can be appreciated, this can be implemented by host assembly 100 and/or guest assembly 200 using any suitable process. For example, the process can involve determining a position of host user 301 in the host environment 300, determining a position of a virtual object relative to host user 301, identifying a movement of the host user 301 and, in response thereto, determining a new position of the host user 301, determining a new position of the virtual object to maintain the same relative position to the host user 301, and repositioning the virtual object into the determined new position. As can be appreciated, the process can be carried out continuously such that the virtual object can follow the host user 301 in real time while the host user 301 moves about. It is appreciated that a similar process can be carried out to cause a virtual object to follow host avatar 301', guest user 401 and/or guest avatar 401'.

As yet a further example, virtual objects 310 can be positioned relative to a field of view of the host user 301 or guest user, such that the virtual objects can remain in a fixed position in the host or guest user's 301, 401, field of view as they move about and/or change their field of view in 3D space. As an example, the virtual object can be positioned such that it always remains in a top-right corner of the host user's field of view. Where the virtual object comprises a video received from auxiliary device, the video from the auxiliary device will always be visible to host user regardless of their current position or field of view in the host environment. As can be appreciated, this can be implemented by host assembly 100 and/or guest assembly 200 using any suitable process. For example, the process can involve determining a position of host user 301 in the host environment 300, determine a field of view of the host user 301 in the host environment, determining a position of a virtual object relative to host user's 301 field of view, identifying a movement of the host user 301 and/or a change of the host user's 301 field of view and, in response thereto, determining a new position and field of view of the host user 301, determining a new position of the virtual object to maintain the same relative position to the host user's 301 field of view, and repositioning the virtual object into the determined new position. As can be appreciated, the process can be carried out continuously such that the virtual object can follow the host user 301 in real time while the host user 301 moves about. It is appreciated that a similar process can be carried out to cause a virtual object to follow host avatar 301', guest user 401 and/or guest avatar 401'.

In some embodiments, tracking of physical objects in the host environment 300 can be carried out by the host assembly 100. The host assembly 100 can subsequently transmit to the guest assembly 200 information relating to new positions of physical objects and/or virtual objects such that the guest assembly 200 can display the physical and/or virtual objects to guest user 401 at their correct positions in real time. In some embodiments, the host assembly 100 can gather and transmit further information about the host environment 300 and physical objects therein to facilitate interaction and assist in virtually reconstructing the host environment 300 at another physical location. For example, the host assembly 100 can be configured to gather volumetric information relating to physical objects in the host environment 300, such as by measuring and/or generating 3D models of physical objects via environment detection module 107, and transmitting such information to the guest assembly 200. In some embodiments, generating 3D models can comprise processing raw scanning data, for example by smoothing scanned surfaces to generate volumetric models without holes or discontinuities. In some embodiments, a reflective solution can be applied to surfaces of physical objects in the host environment 300 to facilitate scanning. The host assembly 100 can further be configured to gather surface information relating to physical objects, such as by sampling surface colors and/or capturing surface texture of physical objects and transmitting such information to the guest assembly 200. In some embodiments, the sampled colors and/or textures can be used to recognize predefined materials or patterns, and information relating to the predefined materials or patterns (such as an identifier) can be communicated to the guest assembly 200.

In an embodiment, the host assembly 100 can comprise a HoloLens or other similar AR/MR device that can be used to gather and transmit information about the host environment that can subsequently be used to virtually reconstruct the host environment 300 remotely. A process of reconstructing the host environment can begin with a volumetric scan of the host environment. This can include scanning surfaces in the host environment via environment detection module 107, to construct a 3D polygonal mesh thereof. The scan can, for example, be carried out using depth sensors provided by the HoloLens and/or other sensors or cameras positioned within the host environment. The scan can be conducted in real time and in different qualities as needed to produce a surface mesh having different polygon sizes. The results of the scan carried out by the HoloLens can be transmitted remotely, for example as a binary file to a remote server and/or directly to guest assembly 200. The scan can be refreshed regularly as needed, for example at intervals of about 10 seconds. In the present embodiment, each time the scan is refreshed, the full binary file containing the complete scan of the host environment 300 can be transmitted. It is appreciated, however, that other configurations are possible. For example, in some embodiments, once an initial scan is sent, changes to the scan can be identified during subsequent refreshes, and only changes to the scan need be transmitted. In some embodiments, a plurality of scans can be conducted in parallel, such as where a plurality of host assemblies and/or AR/MR devices are provided. The plurality of scans can be transmitted separately and/or can be combined into a single binary file.

The mesh from the volumetric scan can be used to reconstruct surfaces detected in the host environment 300. As can be appreciated, the mesh contains volumetric information only without surface texture. Accordingly, subsequent steps can be carried out to capture texture information that can be applied to the mesh to more faithfully reconstruct the appearance of the surfaces detected in the host environment 300.

In an embodiment, texture information can be acquired by capturing color images of the host environment 300. The images can be captured via environment detection module 107 of the one or more host assemblies, for example using a front facing RGB camera provided by the HoloLens and/or other cameras positioned within the host environment. In the present embodiment, the images are captured in the form of a video, for example having a resolution in a range of about 896×504 pixels up to about 2272×1278 pixels, but it is appreciated that other configurations are possible. For example, in some embodiments, high-resolution images of the host environment can be captured at regular intervals.

Acquiring texture information can further include capturing perspective information along with the images of the host environment 300. More specifically, the perspective information can include, for each captured image, a position and orientation of the camera within the host environment 300 at the moment the image was captured (ex: x, y, z position, pitch, yaw, roll orientation). As can be appreciated, the perspective information can be used to properly position and transform the image for projection on the appropriate surface when reconstructing the host environment.

Once acquired, the texture information can be transmitted remotely, for example to a server and/or directly to guest assembly 200. In some embodiments, the texture information can be transmitted in real time, for example as one or more streams over a peer-to-peer connection with guest assembly 200. The texture information can include a video stream comprising images of the host environment synchronized with a corresponding stream of perspective information. In some embodiments, the video and perspective information streams can be transmitted separately and/or in parallel, while in other embodiments the perspective information can be embedded in the video stream and/or in each image. As an example, each captured image in the video stream can be encoded to include its corresponding perspective information, such as by embedding data in the first two rows of pixels in the image.

In some embodiments, salient objects can be identified from the volumetric scan and/or from the texture information, and different scanning techniques can be applied based on the identified object. For example, an object of interest can be identified using any suitable object recognition technique, such as using artificial intelligence, and a more detailed and/or more regular volumetric scan or texture information acquisition can be conducted for that object. An object of lesser interest can be identified in a similar fashion, and a less detailed and/or less regular volumetric scan or texture information acquisition thereof can be conducted, or the object can be omitted from the volumetric scan or texture information acquisition. As an example, identified moving objects can have their volumetric information refreshed at more regular intervals and/or be scanned or imaged lower quality, while static objects identified in the scan can have their volumetric information refreshed at less regular intervals and/or be scanned or imaged at higher quality. In some embodiments, the volumetric scan and/or texture information can include only static objects, while identified moving objects can be omitted. In yet further embodiments, different scanning or modelling techniques can be applied to certain identified objects. For example, if the identified object corresponds to a human, the object can be omitted from the volumetric scan and instead a skeleton of the human can be calculated and transmitted for subsequent reconstruction as an avatar instead of being included as part of the volumetric surface mesh.

As can be appreciated, by communicating volumetric and textural information, the physical objects can be faithfully reconstructed virtually at another physical location by the guest assembly 200. In some embodiments, raw and/or minimally processed volumetric and textural information can be transmitted by the host assembly 100 to the guest assembly 200. It is appreciated, however, that other methods are possible for communicating information about physical objects in the host environment 300. For example, in some embodiments, the volumetric and/or surface information can be used to recognize predefined objects, and information relating to recognized objects can be communicated to the guest assembly 200. In further embodiments, the host assembly 100 can be configured to transmit to the guest assembly 200 data received from auxiliary devices. Such data can, for example, include information that can be used to replicate a graphical user interface of the display 309 of patient monitoring system 307 or other physical object.

Turning now to FIGS. 3A and 3B, the exemplary method for virtual interaction will be explained from the perspective of a guest user. As shown in FIG. 3A, a guest user 401 is situated in a guest environment 400. The guest environment can correspond to any 3D space at a second physical location where the guest user is free to explore. In some embodiments, the space can be delimited by physical barriers, such as walls. In further embodiments, the space can be virtually delimited. For example, the guest environment 400 can correspond to a defined area of a larger space, such as a predetermined area that is equipped for tracking movements and interactions of the guest user 401 therein. In an embodiment, the guest environment 400 is at least the same size as host environment 300, such that there is sufficient space to virtually reconstruct the entirety of the host environment 300 within the guest environment. It is appreciated, however, that in some embodiments, the guest environment 400 can be smaller than the host environment 400. In such an embodiment, the virtual representation of the host environment can be scaled to fit within the guest environment 400 and/or only a portion of the host environment 300 can be recreated in the guest environment at a given time. Additionally, or alternatively, the guest user 401 can be permitted to physically move around in a limited predetermined area of the host environment 300 that corresponds to the physical space available in the guest environment 400. In some embodiments, the guest user 401 can change or select the limited area of the host environment 300 in which the guest user 401 can move around, for example using a controller or other input mechanism.

In the illustrated embodiment, the guest environment 400 is devoid of physical objects. In this configuration, the guest user 401 can move freely throughout the guest environment 400 without physical obstructions. This configuration can also allow for the host environment 300 and environmental objects therein to be virtually recreated in the guest environment 400 without risk of occluding with objects in the guest environment 400. Although not illustrated, it will be appreciated that if the guest environment 400 corresponds to a define area of a larger space at the second physical location, there may exist physical objects outside the defined area.

As shown in FIG. 3B, the guest user 401 interacts with the host user 301 in the guest environment 400 via a guest assembly 200. More specifically, in the illustrated embodiment, the guest user 401 wears a VR headset 403 that virtually transports and immerses the guest user 401 into the host environment 300 by creating a virtual reconstruction of the host environment 300' within a 3D space covered by guest environment 400. In the present embodiment, while wearing the VR headset 403, the guest user's 401 view of guest environment is obstructed and replaced with a view of a digitally reconstructed version of the host environment 300'. It is appreciated, however, that other configurations are possible. For example, in some embodiments the headset 403 can correspond to an AR/MR headset which overlays the 3D reconstructions of host environment 300' on top of the guest environment 400, such that the guest user 401 can retain at least partial visibility on the guest environment 400. In the present embodiment, virtual walls 411 are projected as part of the reconstructed host environment 300', representing a boundary within which the host environment 300' is reconstructed within the physical space of the guest environment 400.

In some embodiments, the VR headset 403 includes a camera that captures images and/or video from the perspective of the guest user 401. In such an embodiment, the guest user can be provided with a virtual view of guest environment 400 as captured by the camera, even though the guest user's 401 actual view of the guest environment 400 is obstructed by the VR headset 403. In some configurations, the guest user 401 can manually switch between the reconstructed view of the host environment 300' and the virtual view of the guest environment 400. In some configurations, the view presented to the guest user can be based on a determination of the guest user's position within the guest environment 400. As an example, if it is determined that the guest user is positioned within the boundary defined by virtual walls 411, the reconstructed view of the host environment 300' can be displayed to the guest user 401 via VR headset 403. Similarly, if it is determined that the guest user is positioned outside the boundary defined by virtual walls 411, the virtual view of the guest environment 400 can be displayed to the guest user 401 via VR headset 403.

When the guest user 401 is positioned within the boundary defined by virtual walls 411 and the reconstructed view of the host environment 300' is displayed, the virtual walls 411 can be projected as part of the view to indicate the boundaries of the reconstructed host environment 300'. In some embodiments, the virtual walls 411 can be opaque when viewed from within the boundaries of the reconstructed host environment 300' such that the guest user 401 cannot see past the virtual walls 411 and outside the reconstructed host environment 300'. In other embodiments, the virtual walls 411 can be transparent or semitransparent when viewed from within the boundaries of the reconstructed host environment 300', such that when looking in the direction of virtual walls 411, the guest user 401 can see past the virtual walls 411 and be provided with the virtual view of the guest environment 400 beyond the boundaries of the reconstructed host environment 300'. Similarly, when the guest user 401 is positioned outside the boundary defined by the virtual walls 411 and the virtual view of the host environment 400 is displayed, the virtual walls 411 can be projected to indicate the boundary within which the reconstructed host environment 300' is located. In some embodiments, the virtual walls 411 can be opaque when viewed from outside boundaries of the reconstructed host environment 300', such that the guest user 401 cannot see past the virtual walls 411 and into the reconstructed host environment 300'. In other embodiments the virtual walls 411 can be transparent or semi-transparent when vised from outside the boundaries of the reconstructed host environment 300', such that when looking in the direction of virtual walls 411, the guest user 401 can see past the virtual walls 411 and be provided with a view of the reconstructed host environment 300' within the boundaries defined by the virtual walls 411. In some embodiments, the virtual walls 411 can be transparent or semi-transparent when viewed from outside, while opaque when viewed from inside, and vice-versa. In some embodiments, the display of the reconstructed host environment 300' and/or the virtual view of the guest environment 400 can be visually altered to facilitate visually distinguishing between views of the reconstructed host environment 300' and the guest environment 400. For example, the reconstructed host environment 300' can be displayed in color, while the virtual view of the guest environment 400 can be displayed in grayscale.

In the present embodiment, the guest user 401 can move around the virtually reconstructed host environment 300' by moving around in the physical space of the guest environment 400. More specifically, as the guest user 401 moves about in the guest environment 400, the 3D view presented to the guest user 401 is updated such that the guest user's field of view corresponds to what the guest user 401 would perceive if they were physically present at the same relative position in the host environment 300. It is appreciated, however, that other configurations are possible for allowing the guest user 401 to explore the 3D reconstruction of the host environment 300'. For example, in some embodiments, the guest assembly 200 can include a control mechanism (such as controller with a joystick, point-and-click gesturing, etc.) that allows the guest user 401 to change their perspective or view within the reconstructed host environment 300' without physically displacing in the guest environment 400. In other words, the control mechanism can allow the guest user 401 to virtually teleport to different locations within the reconstructed host environment 300'. In some embodiments, the guest user 401 can explore the reconstructed host environment 300' using a combination of the above. For example, in embodiments where physical limitations of the guest environment 400 would prevent the guest user 401 from physically exploring the entirety of the reconstructed host environment 300' (for example when the guest environment 400 is smaller than the host environment 300), the guest user 401 can physically explore a limited predefined area of the reconstructed host environment 300' by physically moving about within a corresponding area of the guest environment 400. When reaching the limits of the guest environment 400 (which can be defined by physical or virtual barriers), the guest user 401 could use the control mechanism to virtually teleport to a different location of the reconstructed host environment 300' and explore a new and otherwise inaccessible area of the reconstructed host environment 300'. The new area can correspond to a new limited predefined area of the reconstructed host environment 300' that comprises the location to which the guest user 401 chose to teleport. In some implementations, the new area can be centered around the location to which the guest user 401 chose to teleport. As can be appreciated, such embodiments can enable the guest user 401 to physically explore the entirety of the reconstructed host environment 300' despite physical limitations in the guest environment 400.

The digitally reconstructed host environment 300' presented to the guest user 401 can include virtual representations of environmental elements, such as physical objects that are physically present in the host environment 300. More specifically, in the present embodiment, virtual reconstructions of the table 305' and patient monitoring system 307' are provided in the reconstructed host environment 300' at the same relative positions of their physical counterparts 305, 307 in host environment 300. As can be appreciated, the physical objects can be virtually reconstructed by the guest assembly 200 using any suitable process. Broadly described, the process can involve receiving, by the guest assembly 200, information relating to physical objects 305, 307 in the host environment 300, and generating virtual 3D representations of said objects 305', 307' within the reconstructed host environment 300'. In some embodiments, the guest assembly 200 can receive one or more 3D models from host assembly 100, for example in the form of one or more point clouds or polygon meshes, and render such 3D models at their suitable positions in the virtual environment 300'. In other embodiments, the guest assembly 200 can receive identifiers corresponding to one or more objects and their positions/orientations in the host environment 300 from the host assembly 100. The guest assembly 200 can subsequently use the received identifiers to retrieve corresponding 3D models from memory and/or from a database of predefined models, and render the retrieved 3D models at the specified positions and orientations within virtual environment 300'.

The process of generating 3D representations of physical objects can also include representing surface textures of the physical objects. In particular, when rendering the 3D models of the physical objects 305', 307' within the virtual environment 300', textural elements such as colors or patterns can be applied to the surfaces of the 3D models. As can be appreciated, textural elements can be rendered by guest assembly 200 via any suitable process. Broadly described, the process can involve receiving, by the guest assembly 200, information relating to surface textures of physical objects 305, 307 in the host environment 300, and applying corresponding surface textures to rendered objects 305', 307' within the reconstructed host environment 300'. In some embodiments, the guest assembly 200 can receive one or more surface images from host assembly 100 and apply such images to the appropriate surfaces of the rendered objects 305', 307'. In some embodiments, the guest assembly 200 can receive one or more indications of surface colors from host assembly 100 and apply the surface colors to appropriate surfaces of the rendered objects 305', 307'. In yet further embodiments, the guest assembly 200 can receive one or more identifiers corresponding to predefined materials or patterns. The guest assembly 200 can subsequently use the received identifiers to retrieve textures corresponding to the materials or patterns from memory and/or from a database, and apply the retrieved textures to appropriate surfaces of the rendered objects 305', 307'.

In an embodiment, the information relating to surface textures of physical objects 305, 307 can comprise images of the host environment and perspective information corresponding to a position and orientation of a camera that captured the images. In such an embodiment, once surfaces are positioned within digitally reconstructed host environment 300', for example using received 3D polygonal meshes, the images of the host environment can be applied to those surfaces as textures. More specifically, the guest assembly 200 can be configured to virtually project the images from the host environment on the appropriate surfaces in reconstructed host environment 300' using the perspective information. As an example, the guest assembly 200 can receive a video stream from host assembly 100 (for example via a peer-to-peer connection brokered via authorization server 500 as described above), the video stream having perspective information embedded therein. For each frame of the received video, the guest assembly 200 can extract the embedded position information to obtain the position and orientation within host environment 300 of the camera that was used to capture the image, and position a virtual projector within the reconstructed host environment 300' at the same position and orientation as the camera. The guest assembly 200 can subsequently project the image from the positioned virtual projector onto the surfaces within the reconstructed host environment 300'. This process can be repeated such that textures can be applied from each frame of video received from the host assembly 200. As can be appreciated, this effectively transforms the camera of host assembly 200 in host environment 300 into a virtual projector within reconstructed host environment 300'. The virtual projector can move about the reconstructed environment 300' as the camera of host assembly 200 moves about in the host environment. In other words, the virtual projector can follow the translation and rotation of the camera of host assembly 200 in real time as the camera moves about in the host environment 300.

In some instances, more detailed surface texture may be required to communicate relevant information relating to rendered objects. As an example, patient monitoring system 307 can include a display 309 with a graphical user interface for visually representing detailed patient data. To communicate such information effectively to guest user 401, the virtual representation of the patient monitoring system 307' can be rendered with a detailed virtual representation of the display 309'. In an embodiment, the guest assembly 200 can receive detailed images and/or continuous video of the display 309, and use such images and/or video to create a virtual representation of the display 309' on the virtual patient monitoring system 307'. In an embodiment, the guest assembly 200 can receive a real-time rendering of the graphical user interface shown on the display 309, and apply said rendering to a surface of the patient monitoring system 307' as a virtual representation of the display 309'. In yet a further embodiment, the guest assembly 200 can receive data gathered by the patient monitoring system 307, and use such data to render a graphical user interface 309' for display on the virtual patient monitoring system 307' that substantially corresponds to the graphical user interface shown on the display 309 of the patient monitoring system 307 in the host environment 300. As can be appreciated, the images, video, real-time rendering, or other data can be received from host assembly 100 and/or from auxiliary device 109 over a peer-to-peer stream that can be brokered by authorization server 500 as described above.

As can be appreciated, in addition to physical objects, the digitally reconstructed host environment 300' presented to the guest user 401 can also include digital content. In the illustrated embodiment, the digital content includes at least one virtual object, such as the shared virtual object 310. The shared virtual object 310 can be presented to the guest user 401 in the reconstructed host environment 300' in the same relative position in 3D space as it would appear in the host environment 300. As an example, if the host user 301 repositions the object 310 in the host environment 300, the object 310 can be repositioned in real-time in the reconstructed host environment 300' that is presented to guest user 401. Similarly, if the virtual object 310 is attached to a physical object, if the physical object is moved in the host environment, the virtual object 310 can move in real-time to follow a virtual reconstruction of the physical object in the reconstructed host environment 300'. As described above, the virtual object 310 (whether shared or not) can comprise a video stream received from auxiliary device 109. Live video received from the auxiliary device 109 can thus be displayed as part the virtual object 310 in the reconstructed environment 300' in the same way as in the host environment 300 as described above. The live video can be received by the guest assembly 200 directly from auxiliary device 109 via a direct peer-to-peer connection and/or can be received via the host device 100.

The digital content presented to guest user 401 can further include at least one avatar 301' corresponding to the host user 301, thereby allowing the guest user 401 to see and interact with a virtual representation of the host user 301. The host avatar 301' is controlled by the host user 301 and reflects the current position/perspective of the host user as the host user explores the 3D space of the host environment 300. In some embodiments, the host avatar 301' can reflect gestures that are made by the host user 301. As can be appreciated, in embodiments where a plurality of host users and host assemblies are provided, the digital content can include a plurality of host avatars representative the position/perspective of each of the plurality of the host users.

As can be appreciated, the above-described method and system can allow for complex actions in 3D space to be more effectively and intuitively communicated between users who are not present in the same physical space. In particular, a guest user and a host user can communicate and interact from a distance within the physical environment of the host user. The guest user can be virtually transported into close physical proximity of the host user and, with the help of their avatar, the guest user can make gestures with their hands that can facilitate communication. The guest user is able to see the physical environment of the host user, thus allowing the guest user to observe and/or make reference to elements in the host user's environment. For example, using their avatar, the guest user can point to a tool or other physical object in the host environment, and/or use gestures to explain to the host user how to manipulate the tool while it is being held by the host user. As another example, the guest user can walk around the host environment, observe and inspect objects from a first-person perspective, read information shown on physical displays in the host environment, and communicate with the host user based on what they observed directly. If the guest user is a medical professional, this can allow the medical professional to virtually visit a patient's room, observe the patient, take readings from devices in the room, and provide instructions to host user (such as a medical assistant) to provide medical care all the while not being physically present in the room. Of course, many other applications are possible.

Although particular embodiments have been described above, it is appreciated that other variations are possible without departing from the scope of the disclosure. For example, although a single guest user 401 was shown and described above, it is appreciated that a plurality of guest users can be virtually transported into host environment 300 simultaneously. Each guest user can have a virtual host environment 300' reconstructed in their guest respective environments. In some embodiments, two or more guest users can interact and be present in the same guest environment.

As another example, although a single host user 301 was shown and described, it is appreciated that a plurality of host users can be physically present and interact in the host environment 300. For example, each host user can wear their own AR/MR device to interact with the same guest users and digital content projected in the host environment 300. In such embodiments, data gathered by the plurality of AR/MR devices can be combined to gather more detailed information about the physical environment and allow for a more accurate recreation thereof for guest users 401.

As another example, although the system and method were described in connection with allowing a guest user to interact in a host environment in real-time, it is appreciated that other configurations are possible. For example, the host environment and the host's actions can be recorded and played back at a later time. In such a configuration, the guest user can be immersed in the environment of the host user to observe the environment and/or the host user's actions within the context of the environment at will. This can include playing back the recordings multiple times, at different speeds, and/or observing it from different angles or perspectives in 3D space.

Finally, although in the above-described system and method only objects in the host environment were reconstructed virtually, it is appreciated that other configurations are possible. For example, the guest assembly can include an environment detection module that can allow detecting physical objects in the guest environment for virtually reconstructing in the host environment. In some embodiments, only physical objects at a specified location in the guest environment can be detected, such as within a predefined area, or within a predefined proximity to the guest user. As an example, if the guest user is holding a physical tool, that tool can be scanned and virtually reconstructed in the host environment such that the guest's avatar can be shown holding a virtual representation of the tool.

In the foregoing specification, specific embodiments have been described. However, one of ordinary skill in the art appreciates that various modifications and changes can be made without departing from the scope of the present teachings. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover in this document, relational terms such as first and second and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The invention claimed is:

1. A system for virtual interaction between a host user in a host environment at a first physical location and a guest user at a second physical location, comprising:
   a host assembly at the first physical location, the host assembly comprising:
      an augmented reality (AR) or mixed reality (MR) device comprising a host user interface module configured to:
         display a virtual avatar of the guest user within the host environment based on interaction data relating to the guest user; and
      capture interaction data relating to the host user within the host environment;
      an environment detection module configured to capture environmental information relating to the host environment; and
      a host communications module configured to:
         receive the interaction data relating to the guest user via a first network connection;
         transmit the interaction data relating to the host user via the first network connection; and
         transmit the environmental information relating to the host environment via the first network connection;
   an auxiliary device at the first physical location, the auxiliary device comprising:
      a video device generating a video signal comprising live video at the first physical location;

an auxiliary display displaying the live video at the first physical location, the auxiliary display being separate from the AR or MR device; and a streaming device capturing the video signal and transmitting the live video as a live video stream via a second network connection that is dedicated network connection separate from the first network connection; and a guest assembly at the second physical location, the guest assembly comprising:

a virtual reality (VR) device comprising a guest user interface module configured to:

display a 3D virtual reconstruction of the host environment at the second physical location based on the environmental information;

display a virtual avatar of the host user within the 3D virtual reconstruction of the host environment based on the interaction data relating to the host user;

display a virtual object within the 3D virtual reconstruction of the host environment comprising the live video wherein the virtual object is repositionable by the guest user to remain in a fixed position relative to the guest user's field of view; and capture interaction data relating to the guest user within the 3D virtual reconstruction of the host environment;

a guest communications module communicating with the host communications module via the first network connection and communicating with the streaming device via the second network connection, the guest communications module being configured to:

receive the environmental information captured by the environment detection module via the first network connection;

receive the interaction data relating to the host user in the host environment via the first network connection;

receive the live video stream via the second network connection; and transmit the interaction data relating to the guest user via the first network connection.

2. The system according to claim 1, wherein the environmental information comprises volumetric data, further wherein the environment detection module comprises a volumetric sensor configured to capture the volumetric data corresponding to surfaces in the host environment.

3. The system according to claim 2, wherein the environment detection module comprises a camera configured to capture images of the surfaces in the host environment, further wherein the guest user interface module is configured to render the 3D virtual reconstruction of the host environment comprising 3D models constructed using the volumetric data and textured using the captured images.

4. The system according to claim 1, wherein the streaming device is coupled to the video device via a wired connection to capture the video signal, and the streaming device further comprises a wireless radio for transmitting the live video stream via a wireless network connection.

5. The system according to claim 1, wherein the second network connection is end-to-end encrypted between the guest assembly and the streaming device following an exchange of encryption keys by an authorization server.

6. The system according to claim 1, wherein the guest user interface module is configured to display the virtual object comprising the live video concurrent with the live video being displayed by the auxiliary display.

7. The system according to claim 1, wherein the virtual object comprising the live video is a shared object displayed concurrently by the host user interface module to the host user, and by the guest user interface module to the guest user.

8. The system according to claim 1, wherein the virtual object comprising the live video is a private object displayed only by the guest user interface module to the guest user.

9. The system according to claim 1, wherein the live video displayed by the auxiliary display is physically viewable by the host user while the host user is within the host environment at the first physical location.

10. The system according to claim 1, wherein the virtual object comprising the live video is a virtual reproduction at the second physical location of the auxiliary display that is located at the first physical location.

11. The system according to claim 10, wherein the virtual reproduction of the auxiliary display is displayed at a position within the 3D virtual reconstruction of the host environment that corresponds to the actual physical location of the auxiliary display in the host environment.

12. The system according to claim 10, wherein the interaction data relating to the guest user within the 3D virtual reconstruction of the host environment comprises an indication that the guest user is pointing at an area in relation to the live video comprised by the virtual object, further wherein the host user interface module is configured to display the virtual avatar of the guest user pointing to a corresponding area in relation to the live video displayed by the auxiliary display.

13. The system according to claim 1, wherein the live video comprises a graphical user interface associated with the video device.

14. The system according to claim 1, wherein the video device comprises a patient monitoring system.

15. The system according to claim 1, wherein the guest assembly comprises a camera for capturing video of the second physical location, further wherein the guest assembly is configured to determine a position of the guest user at the second physical location, to display the 3D virtual reconstruction of the host environment when the guest user is determined to be within a predefined area at the second physical location, and to display the video of the second physical location when the guest user is determined to be outside of the predefined area.

16. The system according to claim 1, wherein the streaming device comprises a computing device operating in a kiosk mode, and configured to automatically run an application at start-up to establish the second network connection with the guest communications module, capture the video signal, and transmit the live video stream via the second network connection.

17. The system according to claim 1, wherein the virtual object is further repositionable by the guest user to remain at an absolute position in the host environment or at a position in the host environment relative to the virtual avatar of the guest user or the host user.

18. A method for virtual interaction between a host user in a host environment at a first physical location and a guest user at a second physical location, comprising:

performing, by a host assembly at the first physical location:

receiving, via a first network connection, interaction data relating to the guest user displaying a virtual avatar of the guest user within the host environment based on the interaction data relating to the guest user;

capturing interaction data relating to the host user within the host environment;

transmitting the interaction data relating to the host user via the first network connection;

capturing environmental information relating to the host environment; and transmitting the environmental information via the first network connection;

performing, by an auxiliary device at the first physical location:

generating a video signal comprising live video at the first physical location;

displaying the live video on an auxiliary display at the first physical location, the auxiliary display being separate from the AR or MR device; and capturing the video signal and transmitting the live video as a live video stream via a second network connection that is a dedicated network connection separate from the first network connection; and performing, by a guest assembly at the second physical location:

receiving the environmental information relating to the host environment;

displaying a 3D virtual reconstruction of the host environment at the second physical location based on the environmental information;

receiving the interaction data relating to the host user via the first network connection;

displaying a virtual avatar of the host user within the 3D virtual reconstruction of the host environment based on the interaction data relating to the host user;

receiving the live video stream via the second network connection;

displaying a virtual object within the 3D virtual reconstruction of the host environment comprising the live video, wherein the virtual object is repositionable by the guest user to remain in a fixed position relative to the guest user's field of view;

capturing interaction data relating to the guest user within the 3D virtual reconstruction of the host environment; and transmitting the interaction data relating to the guest user via the first network connection.

19. A non-transitory computer-readable medium for virtual interaction between a host user in a host environment at a first physical location and a guest user at a second physical location, the computer-readable medium having instructions stored thereon which, when executed by one or more processors of a guest assembly, cause the guest assembly to:

receive, via a first network connection, environmental information relating to the host environment as captured by a host assembly at the first physical location;

display a 3D virtual reconstruction of the host environment at the second physical location based on the environmental information;

receive, via the first network connection, interaction data relating to the host user within the host environment as captured by the host assembly;

display a virtual avatar of the host user within the 3D virtual reconstruction of the host environment based on the interaction data relating to the host user;

receive a live video stream via a second network connection that is a dedicated network connection separate from the first network connection, the live video stream corresponding to a video signal captured by a streaming device at the first physical location and comprising live video generated by a video device at the first physical location and displayed on an auxiliary display at the first physical location, the auxiliary display being separate from the AR or MR device;

display a virtual object within the 3D virtual reconstruction of the host environment comprising the live video, wherein the virtual object is repositionable by the guest user to remain in a fixed position relative to the guest user's field of view;

capture interaction data relating to the guest user within the 3D virtual reconstruction of the host environment; and transmit the interaction data relating to the guest user via the first network connection.

20. A system for virtual interaction between a host user in a host environment at a first physical location and a guest user at a second physical location, comprising a guest assembly at the second physical location, the guest assembly comprising:

a guest communications module communicating with a host communications module at the first physical location via a first network connection, and communicating with a streaming device at the first physical location via a second network connection that is a dedicated network connection separate from the first network connection, the guest communications module being configured to:

receive, via the first network connection, environmental information relating to the host environment as captured by a host assembly at the first physical location;

receive, via the first network connection, interaction data relating to the host user within the host environment as captured by the host assembly;

receive a live video stream via the second network connection, the live video stream corresponding to a video signal captured by the streaming device at the first physical location and comprising live video generated by a video device at the first physical location and displayed on an auxiliary display at the first physical location, the auxiliary display being separate from the AR or MR device; and transmit interaction data relating to the guest user via the first network connection; and a virtual reality (VR) device comprising a guest user interface module configured to:

display a 3D virtual reconstruction of the host environment at the second physical location based on the environmental information;

display a virtual avatar of the host user within the 3D virtual reconstruction of the host environment based on the interaction data relating to the host user;

display a virtual object within the 3D virtual reconstruction of the host environment comprising the live video, wherein the virtual object is repositionable by the guest user to remain in a fixed position relative to the guest user's field of view; and capture the interaction data relating to the guest user within the 3D virtual reconstruction of the host environment.

* * * * *